(12) United States Patent
Iben et al.

(10) Patent No.: US 9,431,033 B1
(45) Date of Patent: Aug. 30, 2016

(54) CORROSION RESISTANCE IN AIR BEARING SURFACES

(71) Applicant: International Business Machines Corporation, Armonk, NY (US)

(72) Inventors: Icko E. T. Iben, Santa Clara, CA (US); Lee C. Randall, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/091,985

(22) Filed: Apr. 6, 2016

Related U.S. Application Data

(63) Continuation of application No. 14/997,605, filed on Jan. 18, 2016.

(51) Int. Cl.
*G11B 5/127* (2006.01)
*G11B 5/31* (2006.01)
*G11B 33/14* (2006.01)

(52) U.S. Cl.
CPC ............ *G11B 5/1278* (2013.01); *G11B 5/314* (2013.01); *G11B 5/3106* (2013.01); *G11B 33/14* (2013.01)

(58) Field of Classification Search
None
See application file for complete search history.

(56) References Cited

U.S. PATENT DOCUMENTS

| | | | | |
|---|---|---|---|---|
| 4,400,752 A | * | 8/1983 | Chabrolle | G11B 5/035 360/112 |
| 4,467,382 A | * | 8/1984 | Huisman | G11B 15/605 360/122 |
| 6,741,524 B2 | * | 5/2004 | Ichihara | G11B 5/00 360/59 |
| 6,975,472 B2 | | 12/2005 | Stover et al. | |
| 7,586,710 B2 | * | 9/2009 | Partee | G11B 5/581 360/31 |
| 7,589,928 B2 | * | 9/2009 | Roy | G11B 5/1278 360/69 |
| 7,656,602 B2 | | 2/2010 | Iben et al. | |
| 8,081,398 B2 | * | 12/2011 | Hachisuka | G11B 5/00813 360/125.31 |
| 8,318,242 B2 | | 11/2012 | Bradshaw et al. | |
| 8,508,887 B2 | * | 8/2013 | Wallash | G11B 5/1278 360/122 |
| 9,159,341 B2 | | 10/2015 | Bradshaw et al. | |
| 2009/0260719 A1 | * | 10/2009 | Iben | B82Y 25/00 148/122 |
| 2015/0103441 A1 | | 4/2015 | Bradshaw et al. | |

OTHER PUBLICATIONS

"Relative Humidity", 6 pages, printed on Oct. 21, 2015, <http://hyperphysics.phy-astr.gsu.edu/hbase/kinetic/relhum.html>.
Iben et al., "Corrosion Resistance in Air Bearing Surfaces", U.S. Appl. No. 14/997,605, filed Jan. 18, 2016, 43 pages.

(Continued)

*Primary Examiner* — Brian Miller
(74) *Attorney, Agent, or Firm* — Steven L. Fisher-Stawinski

(57) ABSTRACT

A structure includes an air bearing surface including a plurality of material layers arranged in at least one dimension on the air bearing surface. The structure further includes a microelectronic device and a resistive heating element, which each include at least one of the plurality of material layers. The resistive heating element is electrically isolated from the microelectronic device. The microelectronic device is heated by said resistive heating element. Optionally, a structure includes a tape reader or a tape writer, located at an air bearing surface. A resistive heating element is electrically isolated from the tape reader or writer and heats the tape reader or the tape writer. Optionally, a method includes identifying a microelectronic device located at an air bearing surface, identifying a resistive heating element, which is electrically isolated from the microelectronic device, applying a bias current through the resistive heating element to heat the microelectronic device.

1 Claim, 11 Drawing Sheets

(56) References Cited

OTHER PUBLICATIONS

IBM "Appendix P—List of IBM Patents or Patent Applications Treated as Related", 2 pages, dated Apr. 13, 2016.

Iben et al., "Corrosion Resistance in Air Bearing Surfaces", U.S. Appl. No. 15/097,528, filed Apr. 13, 2016, 40 pages.

IBM, List of IBM Patents or Patent Applications Treated as Related, Appendix P, dated Apr. 14, 2016, 2 pages.

* cited by examiner

CORROSION RESISTANCE IN AIR BEARING SURFACES

BACKGROUND

The present invention relates generally to the field of microelectronics, and more particularly to protecting air bearing microelectronic surfaces from corrosion.

Metal surfaces that are exposed to air are at risk of corrosion damage due to corrosive agents in the environment. For microelectronic structures, even small amounts of corrosion can lead to a failure of any device that includes air bearing surfaces. For example, magnetic tape hardware or hardware for accessing other magnetic media typically include air bearing tape reader and tape writer devices incorporated into a read and/or write head. While protective coatings are available for some applications, such coatings may wear off leaving a device surface exposed to air. Tape read/write heads may include various air-exposed devices. Use of such devices often must be restricted to a highly controlled environment, such as a climate-regulated data center. For applications where it is necessary to have less controlled conditions, engineers continue to face challenges in adequately protecting from corrosion tape reader and tape writer devices as well as other air bearing microelectronic surfaces.

SUMMARY

A structure includes an air bearing surface, which includes a plurality of material layers arranged in at least one dimension on the air bearing surface. The structure further includes a microelectronic device and a resistive heating element, which each include at least one of the plurality of material layers. The resistive heating element is electrically isolated from the microelectronic device. The microelectronic device is heated by said resistive heating element.

Optionally, the microelectronic device and the resistive heating element are separated by an effective distance such that, for a predetermined level of bias current passed through the resistive heating element, the microelectronic device is heated at least to an effective temperature whereat relative humidity at that region of the air bearing surface where the microelectronic device is located is reduced below a predetermined humidity threshold.

In an alternative aspect, a structure includes at least one of a tape a tape writer or a tape reader, located at an air bearing surface. The structure further includes a resistive heating element. The resistive heating element is electrically isolated from the at least one of a tape writer or a taper reader. The at least one of a tape writer or a tape reader is heated by the resistive heating element.

Optionally, the at least one of a tape writer or a tape reader and the resistive heating element are separated by an effective distance such that, for a predetermined level of bias current passed through the resistive heating element, the at least one of a tape writer or a tape reader is heated at least to an effective temperature whereat relative humidity at that region of the air bearing surface where the at least one of a tape writer or a taper reader is located is reduced below a predetermined threshold.

In an alternative aspect, a method includes identifying a microelectronic device located at an air bearing surface, identifying a resistive heating element, which is electrically isolated from the microelectronic device, applying a bias current through the resistive heating element to heat the microelectronic device.

Optionally, the method further includes identifying a predetermined humidity threshold, identifying a separation distance between the microelectronic device and the resistive heating element in at least one dimension, determining an effective temperature for which relative humidity at that region of the air bearing surface where the microelectronic device is located is reduced below the predetermined humidity threshold, and adjusting the bias current such that the microelectronic device is heated at least to the effective temperature.

DETAILED DESCRIPTION

Figure 1:
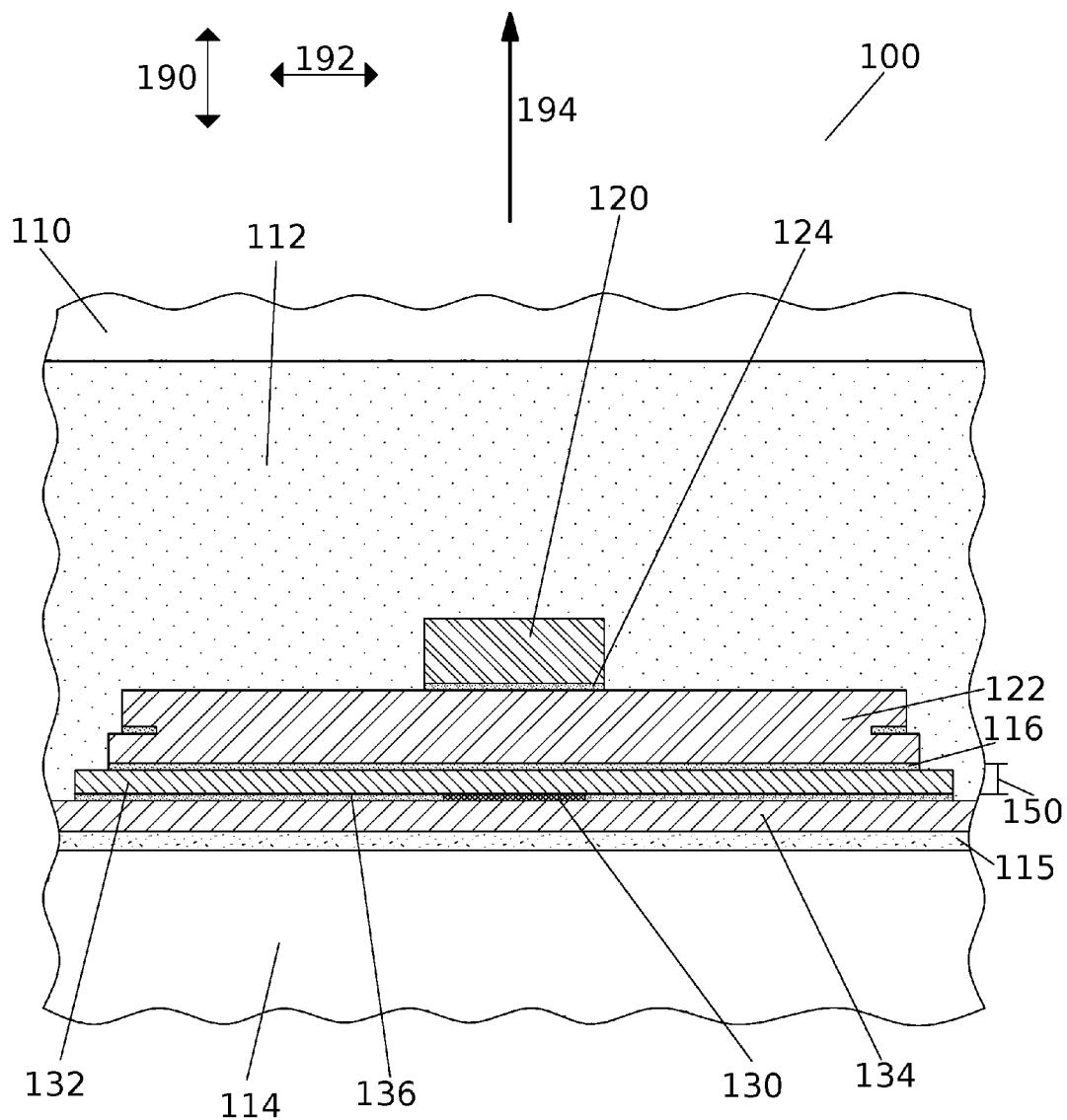
FIG. 1 is a plan view of the air bearing surface of a "piggyback" writer and reader device, in accordance with at least one embodiment of the present invention.

Various microelectronic devices, such as the reading and writing apparatus of magnetic tape drive storage devices, include an air bearing surface. Such surfaces are at risk of corrosion due to the combined interaction of corrosive ionic material with the surface metal material and water. Sensitive microelectronic devices which are directly exposed to the atmosphere can become corroded if the atmosphere contains even small amounts of a corrosive agent, resulting in performance degradation or failure. For magnetic read/write heads used to store and read-back data on magnetic media, very low levels of corrosion can result in damage, for example by Wallace spacing losses for read amplitudes or write field magnitudes and/or reduced magnetic moment of the writer at the air-bearing-surface. Ionic corrosion from gases such as HCl and $H_2S$ require at least a layer of water molecules (e.g., a monolayer) to transport the ions to the exposed metals and to catalyze the chemical reaction. Thus, many damaging chemical reactions will not take place in an environment where the relative humidity (RH) is sufficiently low as to inhibit the formation of a layer of moisture on the metal surface. For some applications, it is possible to carefully control the relative humidity a sufficiently low level, thereby keeping the metal at the air bearing surfaces (e.g., of tape or hard disk heads) sufficiently dry so as to prevent corrosive chemical reactions, regardless of the present of ionic material. For various other applications, it is not possible to provide a controlled environment, and corrosion protection requires other means.

Heating the metals at an air bearing surface locally can raise the metals' temperature sufficiently to reduce local relative humidity to below a critical threshold below which it is not possible to form a continuous layer of moisture on the metal surface, and thus inhibiting o corrosion. Many microelectronic devices have an innate electrical resistance so as to be susceptible to resistive heating (Joule heating) by applying a bias current through the material. For example, tape drive reader devices can be heated in this way by applying a bias current when the reader is not in use for reading from a tape. In the context of the present invention, the term "tape" principally means a magnetic tape suitable for storing data in the form of magnetic bits. Tapes having different or unconventional electromagnetic properties, including nonmagnetic tapes, may, however, potentially interact with air bearing microelectronic devices, and are thus also contemplated. Other devices, such as tape writer devices, may either be damaged if directly heated in this way or may have no practical means of being self-heated. Such devices may be understood to not be able to functionally carry current. In the context of the present invention, a "piggyback" combined reader and writer device may be equipped with a resistive heating element as a component of the reader. The writer device may be warmed indirectly by localized heat from the reader without passing a bias current through the writer itself. More generally, a microelectronic device at an air bearing surface may be positioned proximate to a distinct and electrically isolated resistive heater, which may receive a bias current to generate localized heat, indirectly heating the microelectronic device.

Figure 8:
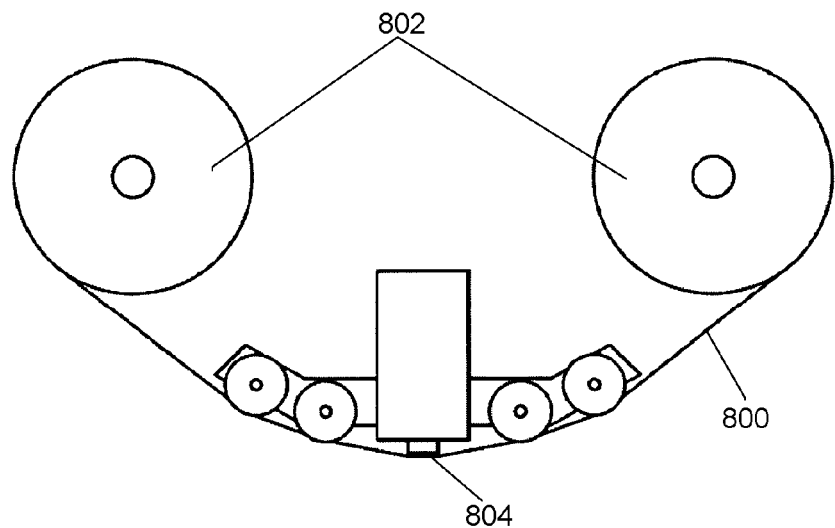
FIG. 8 is a simplified schematic view of a tape drive system, in accordance with at least one embodiment of the present invention.
Figure 9:
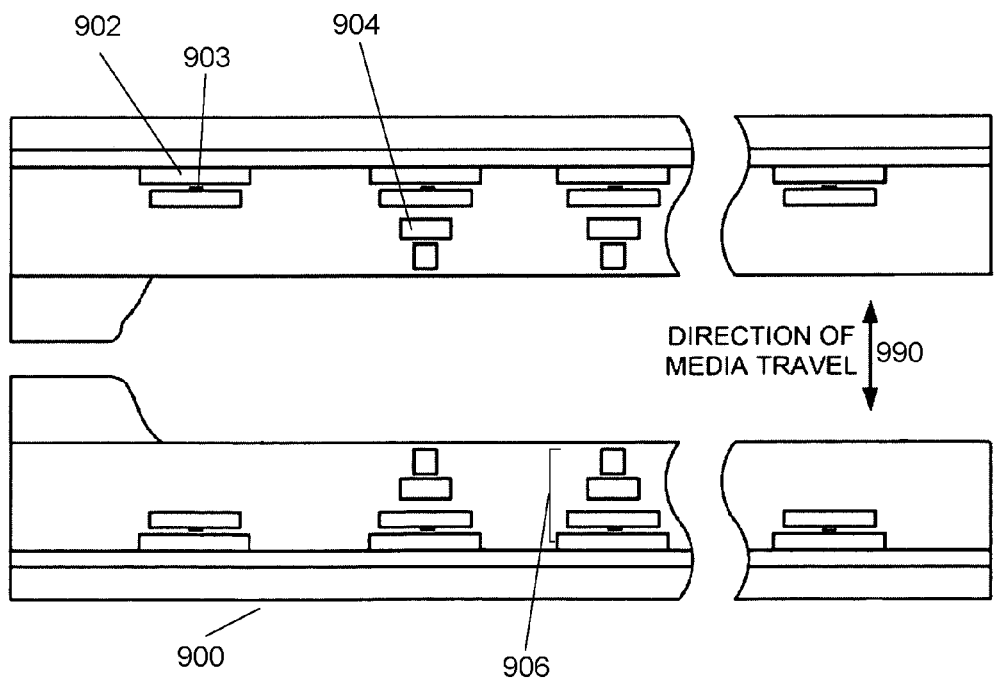
FIG. 9 is a simplified schematic view of multiple tape interaction devices, in accordance with at least.

FIGS. 8 and 9 identify the general layout of a tape drive system, in accordance with some embodiments of the present invention. FIG. 8 presents a simplified schematic side view of a tape drive system including the tape 800, which is spooled between two reels 802 to run over a read and/or write head 804. FIG. 9 presents a simplified schematic plan view of various air bearing microelectronic structures of a reading and/or writing device. In FIG. 9, the tape 800 may be understood to be positioned above the read/write head 900, relative to the viewer, and to be movable forward or backward in at least one dimension, the dimension of media travel 990. The cutaway portion of FIG. 9 represents the different possible widths of the tape 800 and correspondingly different possible numbers of readers 902 and writers 904. In some embodiments, sixteen devices may be positioned across the width of the tape 800. Each reader 902 may include a resistive heating element 903. The reader 902 may be combined with a writer 904 into a "piggyback" structure 906. Such that the writer 904 is heated indirectly by the resistive heating element 903.

Referring now to FIG. 1, FIG. 1 depicts a plan view of an air bearing surface 100 including a combined "piggyback" reader and writer. The air bearing surface 100 includes microelectronic structures arranged in a first dimension 190 with various structures aligned with reference to an axis 194. A tape, such as the tape 800, may be understood to be elevated above the air bearing surface 100, relative to the viewer of FIG. 1, with the tape movable in at least one dimension. Specifically, the tape may be movable forward and backward in the first dimension 190, and may be fixed in position in a second dimension 192, which may be perpendicular to the first dimension 190 in a plane with the depicted air bearing surface 100 (although, the air bearing surface need not necessarily be flat in all embodiments of the present invention).

Referring still to FIG. 1, the air bearing surface 100 includes a first substrate layer 110 and a second substrate layer 114, above and below the various devices, as shown. The first substrate layer 110 and second substrate layer 114 may be composed of ceramic substrate material. A first dielectric layer 112 may surround the various devices of the invention and a second dielectric layer 115 may lie between the various devices and the second substrate layer 114. The first dielectric layer 112 and second dielectric layer 115 may be joined distally around the edges of the various devices, and they may be composed of alumina or similar dielectric material.

Referring still to FIG. 1, a first tape reader metal element 132 may oppose a second tape reader metal element 134, both centered with reference to the axis 194, which forms an axial line for the depicted devices. The first tape reader metal element 132 and second tape reader metal element 134 may be configured for reading from a tape, such as the tape 800, according to known structures and methods, for example as components of a magnetoresistive reader. Both the first tape reader metal element 132 and the second tape reader metal element 134 may be composed of copper or other conductive material. In the depicted embodiment, the first tape reader metal element 132 and second tape reader metal element 134 are separated by one or more tape reader dielectric layers 136, which are positioned distally on either side of the axial line, as shown. Centrally, as to the axial line of the axis 194, the first tape reader metal element 132 and the second tape reader metal element 134 may be separated by the resistive heating element 130, which may include or be composed of a thin film resistor. Together, the first tape reader metal element 132, the second tape reader metal element 134, and the resistive heating element 130 may form a tape reader. Accordingly, the tape reader may be understood to include the resistive heating element 130. The tape reader may further be understood to be configured to read from the tape 800. The resistive heating element 130 may be separated from the reader elements such as the first tape reader metal element 132 and the second tape reader metal element 134 by thin layers of alumina or other dielectric, however these barriers need not separate the tape reader from the resistive heating element to the same degree as for the tape writer, which does not functionally carry current.

Referring still to FIG. 1, a first electromagnetic pole element 120 may oppose a second electromagnetic pole element 122, separated by a write gap 124, which may include a layer of alumina or similar dielectric material. The first electromagnetic pole element 120 and second electromagnetic pole element 122 may be in electromagnetic communication, below the air bearing surface 100 in a manner controllable by a coil such that a magnetic field may be generated with sufficient strength and uniformity above the write gap 124 for writing to a tape, such as the tape 800, according to known structures and methods, for example as components of an inductive writer. The first electromagnetic pole element 120 and second electromagnetic pole element 122 may be constructed of a soft magnetic material such as Nickel-Iron (45:55 NiFe, etc.). Some writers may use a laminate of different magnetic alloys. The first electromagnetic pole element 120 and second electromagnetic pole element 122 together may form a tape writer. The tape writer may be understood as configured for writing to the tape 800.

Referring still to FIG. 1, the tape writer may be electrically isolated from the tape reader by an isolation dielectric layer 116. The tape writer may be proximate to the tape reader such that the resistive heating element 130, included in the tape reader, heats the tape writer. In the depicted embodiment, an effective distance 150 separates the resistive heating element 130 from the second electromagnetic pole element 122, as described further below.

Figure 2:
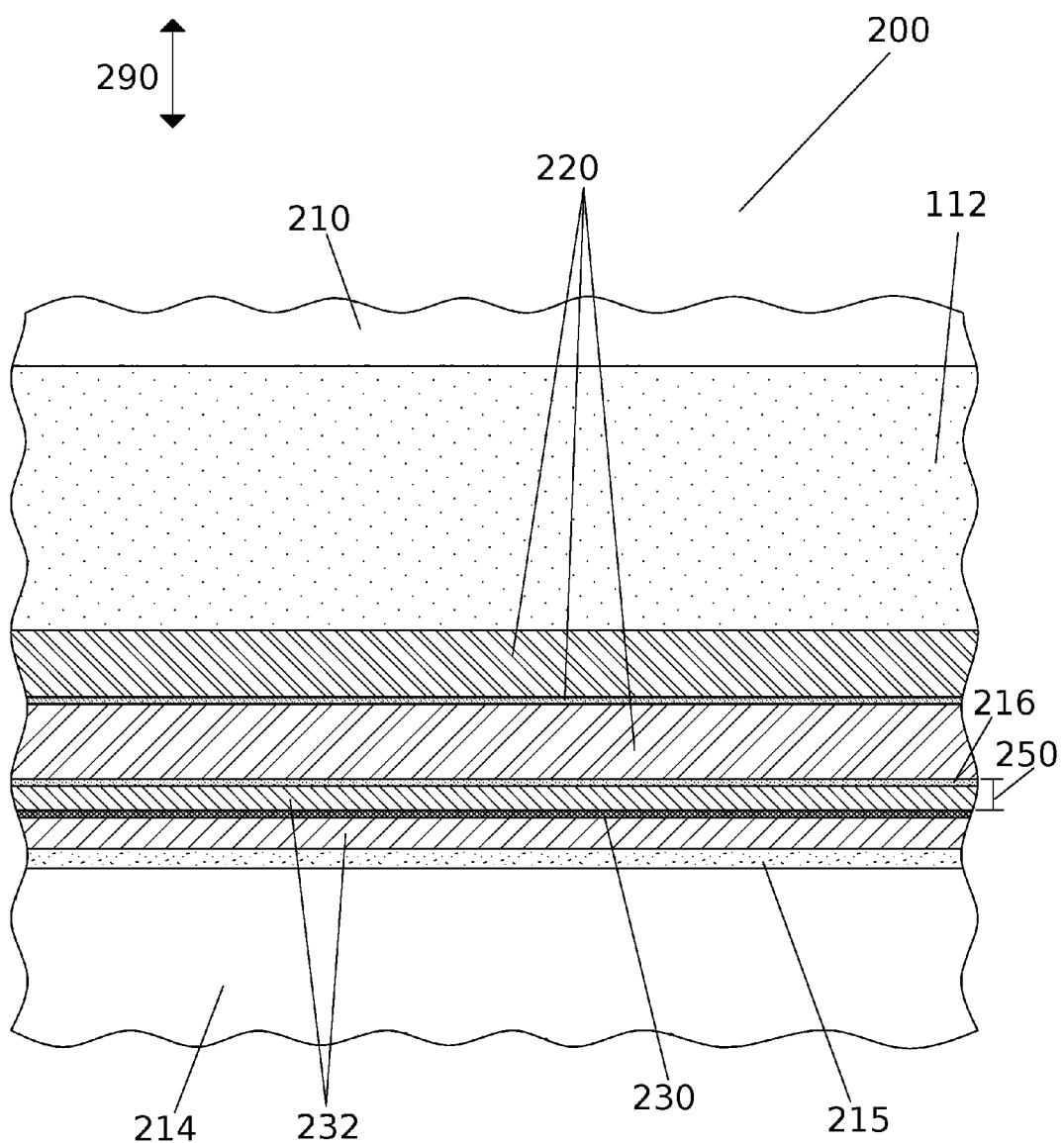
FIG. 2 is a plan view of a generic microelectronic device and resistive heater, in accordance with at least one embodiment of the present invention.

Referring now to FIG. 2, more generally, the invention may be applied to a microelectronic device at an air bearing surface 200. The air bearing surface 200 may include a plurality of material layers, arranged in at least one dimension, such as the dimension 290, on the air bearing surface 200. The plurality of material layers may include a first substrate layer 210 and a second substrate layer 214, which may both be composed of e.g., a ceramic substrate material. Analogously to FIG. 1, a first dielectric layer 212 and a second dielectric layer 215 may lie between the various devices and the first substrate layer 210 and/or second substrate layer 214, which may be composed of alumina. A microelectronic device 220 may include at least one of the plurality of layers. As depicted, the microelectronic device may include various combinations of metal and dielectric layers, similarly to the writer of FIG. 1. A resistive heating element 230, such as a thin film resistor, may also comprise at least one of the plurality of layers. The resistive heating element 230 may be incorporated into a directly heatable device 232, which may include one or more of the plurality of layers and may be understood as analogous to the tape reader of FIG. 1. The resistive heating element 230 may be electrically isolated from the microelectronic device 220, for example, by an isolation dielectric layer 216. In the depicted embodiment, an effective distance 250 separates the resistive heating element 130 from the second electromagnetic pole element 122, as described further below.

Referring still to the embodiment depicted in FIG. 2, the microelectronic device 220 is heated, indirectly, by localized heat from the resistive heating element 230. In the context of the present invention, to be heated indirectly means receiving at least one of radiant, conductive, or convective heat without being in direct contact such that the received heat is mediated through (or, in the case of radiant heating, passes through) the material(s) of the plurality of layers or through air or other surrounding material. Accordingly, in at least some embodiments, the microelectronic device 220 and the resistive heating element 230 may be understood as distinct structures such that the resistive heating element 230 is not incorporated into the microelectronic device 220, even as the resistive heating element 230 may be incorporated into another device, such as the directly heatable device 232. Equivalently, some embodiments may be such that the microelectronic device 220 is not susceptible to direct heating.

Figure 3:
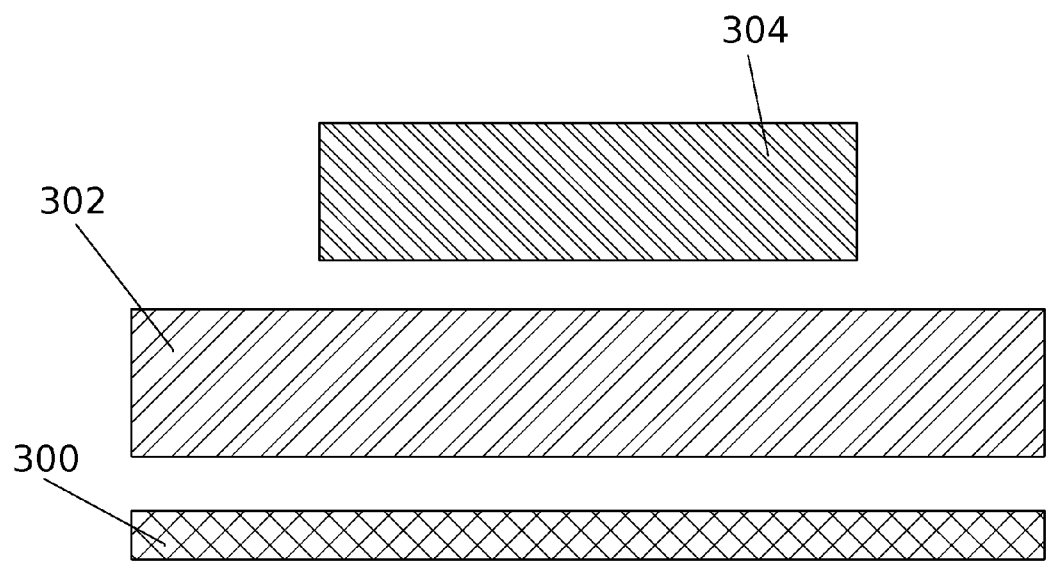
FIG. 3 is a simplified schematic view of a writer and resistive heating device, in accordance with at least one embodiment of the present invention.
Figure 4:
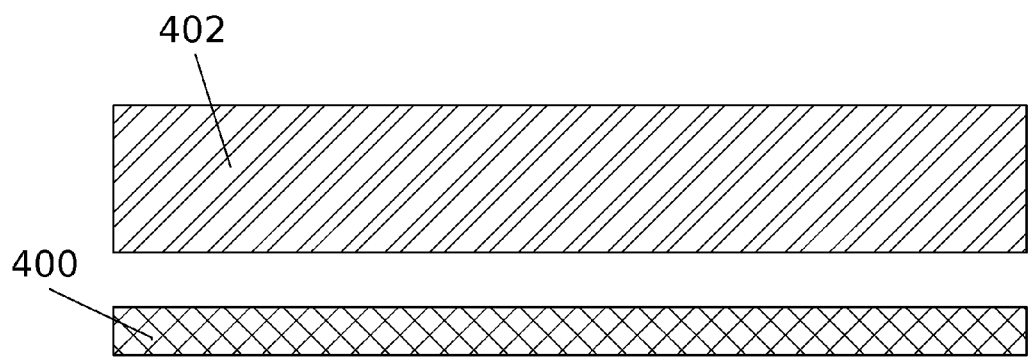
FIG. 4 is a simplified schematic view of a generic microelectronic device and resistive heater, in accordance with at least one embodiment of the present invention.

FIGS. 3 and 4 provide a simplified schematic understanding of various embodiments of the invention. FIG. 3 displays a first electromagnetic pole element 302 opposing a second electromagnetic pole element 304 to form a tape writer. Both are proximate to, but not in contact with, a resistive heating element 300. Similarly, FIG. 4 depicts an abstracted microelectronic device 402, of generally any kind, proximate to a resistive heating element 400. For both FIGS. 3 and 4, the simplified devices shown, at an air bearing surface, would be protected from corrosion by localized heating.

Additionally, FIG. 3 demonstrates how a writer including the first electromagnetic pole element 302 and the second electromagnetic pole element 304 may be packaged with the resistive heating element 300 into a module 310. The module 310 may be understood as the writer-heater combination for incorporation into a tape head or other larger device. Similarly, the generic, abstracted microelectronic device 402 may be packaged, together with the resistive heater 400, into a module 410 for inclusion into a larger device. In some embodiments, the abstracted microelectronic device 402 may be a tape reader, for example, where project-specific considerations prevent the reader from being self-heated, as per FIG. 1. Within the field of tape interaction devices, a resistive heating element and at least one of a tape reader and a tape writer may be packaged together as a module. More generally, a resistive heating element and any microelectronic device may be packaged together as a module.

Figure 5:
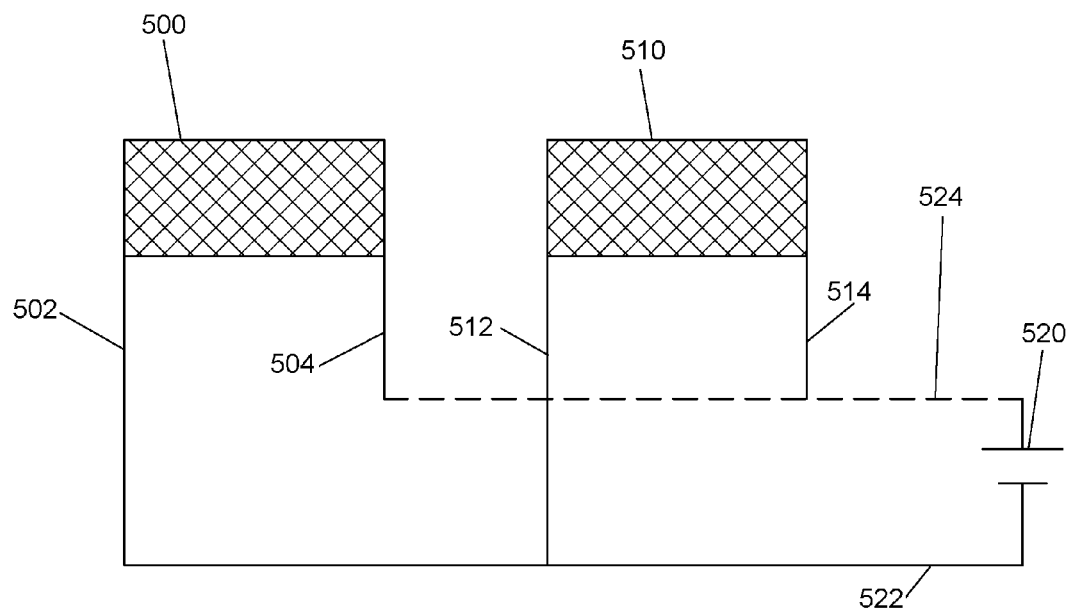
FIG. 5 is a simplified schematic view of multiple resistive heaters powered from a common power source, in accordance with at least one embodiment of the present invention.

Referring now to FIG. 5, a first resistive heating element 500 and a second resistive heating element 510 may be present in the same system. FIG. 9 depicts an example of a system wherein the resistive heating element 903 is one of a plurality of resistive heating elements. The first resistive heating element 500 may be in electrical communication with a first lead 502 and a second lead 504. Similarly, the second resistive heating element 510 may be in electrical communication with the first lead 512 and a second lead 514. A common source such as the common power source 520 may be in electrical communication with a power source first lead 522 and a power source second lead 524. By connecting the first leads 502 and 512 with the power source first lead 522, and by connecting the second leads 504 and 514 with the power source second lead 524, as shown, at least two of a plurality of resistive heating elements (e.g., 500 and 510) may be powered in from the common power source 520 such that the at least two of the plurality of resistive heating elements (e.g., 500 and 510) are commonly controllable via the common power source 520. The depicted configuration permits uniform resistive heating for all heaters and protected devices for a given structure. FIG. 5 depicts a circuit in which the heating elements 500 and 510 are configured in parallel, however alternatives include configuring the heaters in series or a combination of series and parallel, according to engineering considerations to have desired electrical properties for the particular embodiment.

Various configurations may provide bias currents at each heater that are equal to one another, approximately equal to one another, or differently proportional to current through the common power source 520. Practical reasons for selecting one connection type or another include, for multiple resistive elements (e.g., 500, 510), whether the resistive elements need to be powered identically such that the same total power is consumed for each resistive heating element. However, if the heating elements are connected in series, the voltage required increases linearly with the number of heating elements. It is possible that the common power source 520 will not have sufficient voltage available. By contrast, when connecting the resistive elements in parallel, the current required increases linearly with the number of heating elements, and the common power source 520 may be limited in the amount of current which it can supply. More complex configurations may include creating multiple groups of multiple resistive heater, with the heaters within the group configured in series and the groups configured in parallel. Thus, a common power supply may be designed for larger numbers of heating elements. For example, with thirty resistive elements, one possible configuration includes connecting six groups of five resistive heaters each in series within each group, with the six groups in parallel. In this case, the voltage supplied to each group would be five times the amount applied across each individual heater, and the total current would be only six times the current through each individual heater. In the stated example, if the heaters were all connected in parallel, the total current would have been thirty times the current through each individual heater, while if the heaters had been connected in series, the voltage required would have been thirty times the voltage across an individual heater.

In general, the various embodiments of the invention may include passing a bias current through the heating element 230 to heat the microelectronic device 220. The value of the bias current may be varied by varying the voltage applied, given a fixed resistance of the resistive heating element 230 for a given embodiment. Equivalently, variations in the structure and material properties of the resistive heating element relate to the amount of localized heat that is emitted. Additionally, the distance between the resistive heating element 230 and the microelectronic device 220 affects the amount of localized heat reaching the microelectronic device. In various embodiments, the microelectronic device 220 and the resistive heating element 230 may be separated by an effective distance 250 such that, for a predetermined level of bias current passed through the resistive heating element, the microelectronic device is heated at least to an effective temperature whereat relative humidity at that region of the air bearings surface 200 where the microelectronic device is located is reduced below a predetermined humidity threshold.

Equivalently, and with reference to the embodiment depicted in FIG. 1, the tape writer and the resistive heating element 130 may be separated by an effective distance 150 such that, for a predetermined level of bias current passed through the resistive heating element 130, the tape writer is heated at least to an effective temperature whereat relative humidity at that region the air bearing surface 100 where the tape writer is location is reduced below a predetermined threshold.

Figure 6:
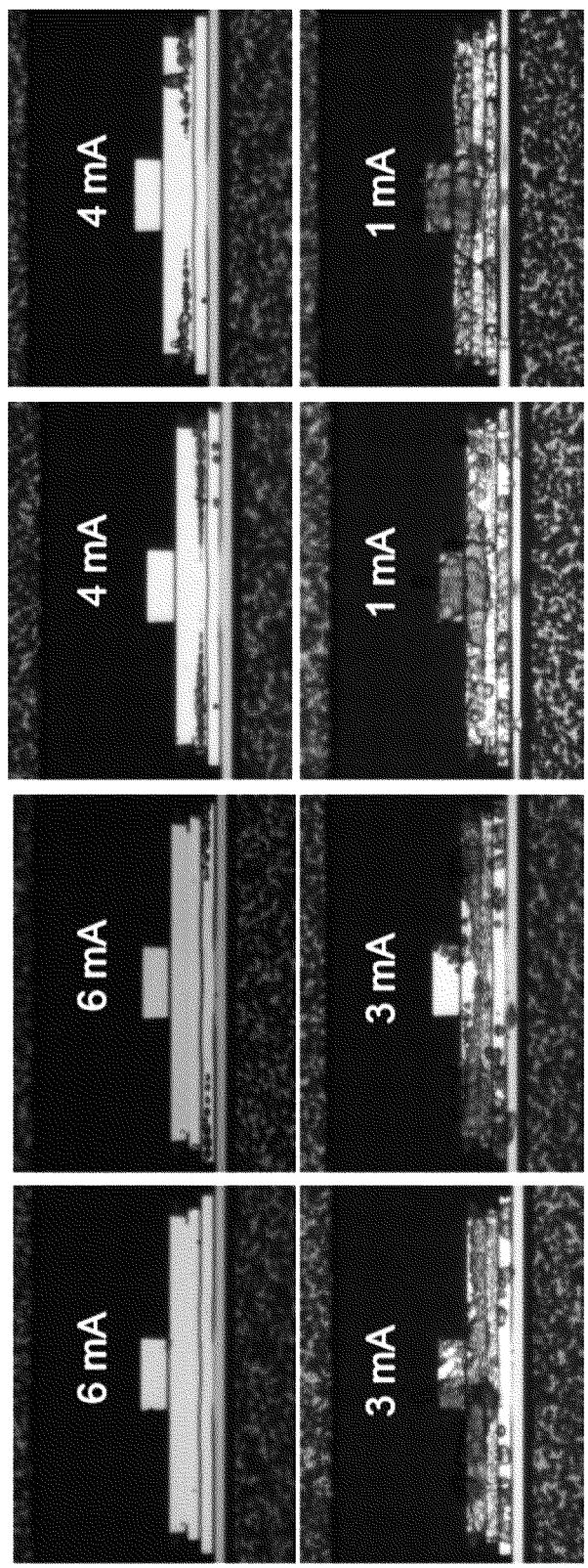
FIG. 6 is a set of optical microscopy images depicting various "piggyback" writer and reader devices of an experimental example of at least one embodiment of the present invention.
Figure 7:
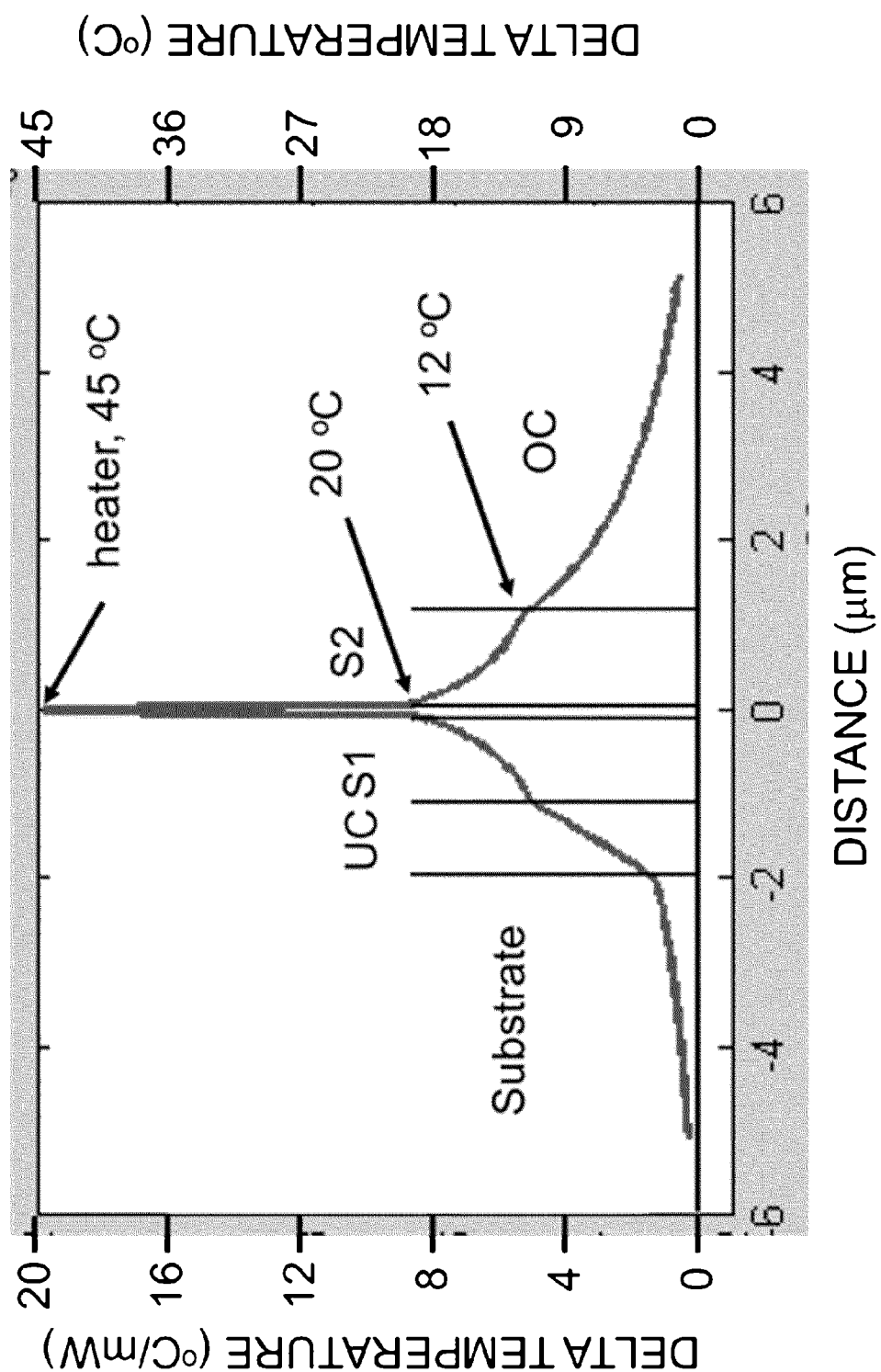
FIG. 7 is a graph of data from an experimental example of at least one embodiment of the present invention.

Referring now to FIG. 6, the inventors conducted an experiment based on the present invention. A row bar including multiple self-similar structures (similar to the embodiment depicted in FIG. 1) was cabled so that each resistive heating elements could be powered separately. The row bar was placed in a humidity chamber at relative humidity of 84%. Each resistive heating element was characterized by a resistance of approximately 100 ohms. Various structures were powered with currents of 1 mA, 3 mA, 4 mA, and 6 mA. HCl gas was injected into to the 2 liter chamber to a projected equilibrium concentration of 20 ppm (if all HCl remained gaseous). FIG. 6 displays optical microscopy images for various structures at various levels of bias current. It is apparent from the microscopy images that the write structures were markedly less corroded where a larger bias current was applied to the heater (e.g., 6 mA) than where a smaller bias current as applied (e.g., 1 mA). In particular, at 6 mA bias current, there was virtually no corrosion at the write gap. FIG. 7 displays the observed thermal profile of the test devices as local temperature in relation to distance offset from the resistive heater in the dimension corresponding to the direction of tape movement.

To understand the Joule heating of metals which do not have heating current flowing through them, the inventors performed finite element analysis (FEA) calculations using the plausible thermal conductivity the alumina surrounding the heater and the metals themselves. The results of the FEA were that the temperature rise of the heater ($\Delta T_{htr}$) is proportional to the power deposited into the heater ($P_{htr}$):

$$\Delta T_{htr} = \frac{P_{htr}}{\kappa_{htr}} \qquad \text{Equation 1}$$

$$\kappa_{system} = \kappa_0 + \kappa_A \cdot A_{htr} \qquad \text{Equation 2}$$

$\kappa_{htr}$ is the thermal conductance of the heater structure and its surroundings. $\kappa_o$ and $\kappa_A$ are a constants related to the thermal conductivity of the metals surrounding the heater, and $A_{htr}$ is the area to be heated. The inventors have observed Equation 2 to be descriptive for areas on the order of 1 µm² with values of $\kappa_o$=14 mW/° C. and $\kappa_A$=42 mW/° C./µm². The metals surrounding the heater may also be heated through thermal conduction from heat source of the resistive heating element to the surrounding metals. The heat may diffuse from the heater to the metals surrounding the heater. The temperature rise of the surrounding metal, $\Delta T_M$, is also linear with $P_{htr}$:

$$\Delta T_M = \frac{P_{htr}}{\kappa_{htr}} = C_M \cdot T_{htr} = \frac{\kappa_{htr}}{\kappa_M} \cdot \Delta T_{htr} \qquad \text{Equation 3}$$

$$C_M = \frac{\kappa_{htr}}{\kappa_M} \qquad \text{Equation 4}$$

Table 1 gives the relevant values of the thin-film metal heater for determining the temperature rise, and the calculated temperature rise using finite element analysis (FEA). At 6 mA, the heating is calculated to be 45° C., and at 1 mA, 1° C., supporting the concept that the heating is protecting the devices. The value of less than 30% RH was chosen by the inventors because they observed and/or recognized that the rate of corrosion of the thin metals used in magnetoresistive (MR) readers and tape writers is essentially arrested even for very high levels of corrosive gases (e.g., ~10 ppm of HCl gas). The inventors have further observed and/or recognized that reducing RH into the range of 60%-70% will significantly decrease corrosion rates and can thus offer protection against corrosion. Additionally, RH in the range of 30%-60% may be expected to have an intermediate effect.

TABLE 1

| $R_{htro}$ (ohm) | $P_{htr}$ (mW) | Area (um2) | $\Delta T_{htr}$ (1 mA) (° C.) | $\Delta T_{htr}$ (3 mA) (° C.) | $\Delta T_{htr}$ (4 mA) (° C.) | $\Delta T_{htr}$ (6 mA) (° C.) |
|---|---|---|---|---|---|---|
| 65 | 2.25 | 0.90 | 1.3 | 11.2 | 20.0 | 45 |

Table 2 shows the Joule heating temperature required to reduce the local relative humidity of the heater to below 30% (an exemplary relative humidity threshold) to protect the heater from corrosion when the ambient temperature and ambient relative humidity are $T_{air}$ and $RH_{air}$, respectively.

TABLE 2

| $RH_{air}$ | $T_{air}$ | (° C.) | 20 | 25 | 30 | 35 | 40 | 50 |
|---|---|---|---|---|---|---|---|---|
| 40% | $\Delta T_M$ | (° C.) | 5.1 | 5.3 | 5.5 | 5.6 | 5.8 | 6.0 |
| 50% | $\Delta T_M$ | (° C.) | 9.1 | 9.4 | 9.7 | 10.0 | 10.3 | 10.6 |
| 60% | $\Delta T_M$ | (° C.) | 12.3 | 12.7 | 13.1 | 13.4 | 14.0 | 14.5 |
| 70% | $\Delta T_M$ | (° C.) | 15.0 | 15.5 | 16.0 | 16.6 | 17.1 | 17.6 |
| 80% | $\Delta T_M$ | (° C.) | 17.4 | 18.0 | 18.6 | 19.2 | 19.8 | 20.4 |
| 90% | $\Delta T_M$ | (° C.) | 19.5 | 20.1 | 20.8 | 21.5 | 22.2 | 22.9 |

The heating required may be set more precisely if the relative humidity is known. Equation 5 shows a quadratic expression used to fit the saturation vapor density ($V_{sat}$) versus temperature:

$$V_{sat}(T_C) = V_{S0} + V_{S1} \cdot T_C + V_{S2} \cdot T_C^2 = 24.164 - 1.257 T_C + 0.48 T_C^2 \quad \text{Equation 5}$$

$T_C$ is the temperature in degrees Celsius. The saturation volume was fit to a quadratic expression. The relative humidity may be understood as the actual vapor density, $V_{moisture}$, divided by the saturation vapor density:

$$RH = \frac{V_{moisture}}{V_{sat}} \quad \text{Equation 6}$$

If $T_{env}$ is known, then Equation 5 becomes $V_{sat\text{-}env} = V_{sat}(T_{env})$. If the environmental relative humidity ($RH_{env}$) is known, then the moisture level is described as:

$$V_{moisture} = RH_{env} \cdot V_{sat}(T_{env}) \quad \text{Equation 7}$$

If the local temperature of the device being protected is increased by $\Delta T_{dev}$ above $T_{env}$, then the local relative humidity, $RH_{loc}$, is given by:

$$RH_{loc} = \frac{V_{moisture}}{V_{sat}(T_{env} + \Delta T_{dev})} = RH_{env} \cdot \frac{V_{sat}(T_{env})}{V_{sat}(T_{env} + \Delta T_{dev})} \quad \text{Equation 8}$$

Or, to achieve a desired $RH_{loc}$:

$$V_{sat}(T_{env} + \Delta T_{dev}) = V_{sat}(T_{env}) \cdot \frac{RH_{env}}{RH_{loc}} \quad \text{Equation 10}$$

$$(V_{s1} + 2 \cdot V_{s2} \cdot T_{env} + V_{s2}) \cdot \Delta T_{dev} + V_{s2} \cdot \Delta T_{htr}^2 = V_{sat}(T_{env}) \cdot \frac{RH_{env} - RH_{loc}}{RH_{loc}} \quad \text{Equation 11}$$

$$\Delta T_{dev} = \frac{-B + \sqrt{B^2 - 4 \cdot A \cdot C}}{2 \cdot A} \quad \text{Equation 12a}$$

$$A = V_{s2} \quad \text{Equation 12b}$$

$$B = V_{s1} + 2 \cdot V_{s2} \cdot T_{env} + V_{s2} \quad \text{Equation 12c}$$

$$C = -V_{sat}(T_{env}) \cdot \frac{RH_{env} - RH_{loc}}{RH_{loc}} \quad \text{Equation 12d}$$

Equations 12a, 12b, 12c, and 12d demonstrate how the quadratic formula may be applied to Equation 11 to solve for $\Delta T_{dev}$, the effective temperature rise to reduce corrosion in a given device to below a relative humidity threshold. Thus, where both the environmental temperature, $T_{env}$, and relative humidity, $RH_{env}$, are measured, the local relative humidity, $RH_{local}$, versus local temperature, $T_{local}$, may be calculated using the above polynomial function from known values of saturation vapor density. The Joule heating temperature rise of the metal being protected, $\Delta T_M$, required to achieve a particular $RH_{local}$ is determined from the polynomial. The Joule heating temperature rise ($\Delta T_{htr}$) versus power into the heater, $P_{htr}$, is determined such that:

$$\Delta T_{htr} = \frac{P_{htr}}{\kappa_{htr}} \quad \text{Equation 13}$$

In Equation 13, $\kappa_{htr}$ is a parameter termed the conductance, and it depends on the thermal properties and geometries of the materials surrounding the heater. The fractional temperature rise of the metal being protected $\Delta T_M$ is determined such that:

$$\Delta T_M = f_M \Delta T_{htr} = f_M \frac{P_{htr}}{k_{htr}} \quad \text{Equation 14}$$

In Equation 14, $f_M$ is a fraction less than unity and depends on the materials surrounding the metal and separating the metal from the heater and the geometry and thermal properties of the metal itself. These parameters are used to determine the necessary power into the heater to achieve the particular $RH_{local}$.

The Joule heating temperature rise of the writer pole may be determined to be a fraction of the temperature rise of the metal film used to heat the writer pole through diffusion. The fractional amount is predetermined. The temperature rise of the heating element may be measured by the resistance change of the heating element, which may be used to determine the temperature of the distant writer pole. The temperature rise of the writer pole may be determined using finite element calculations or by some optical thermometry measurement or some other physical measurement.

Figure 10:
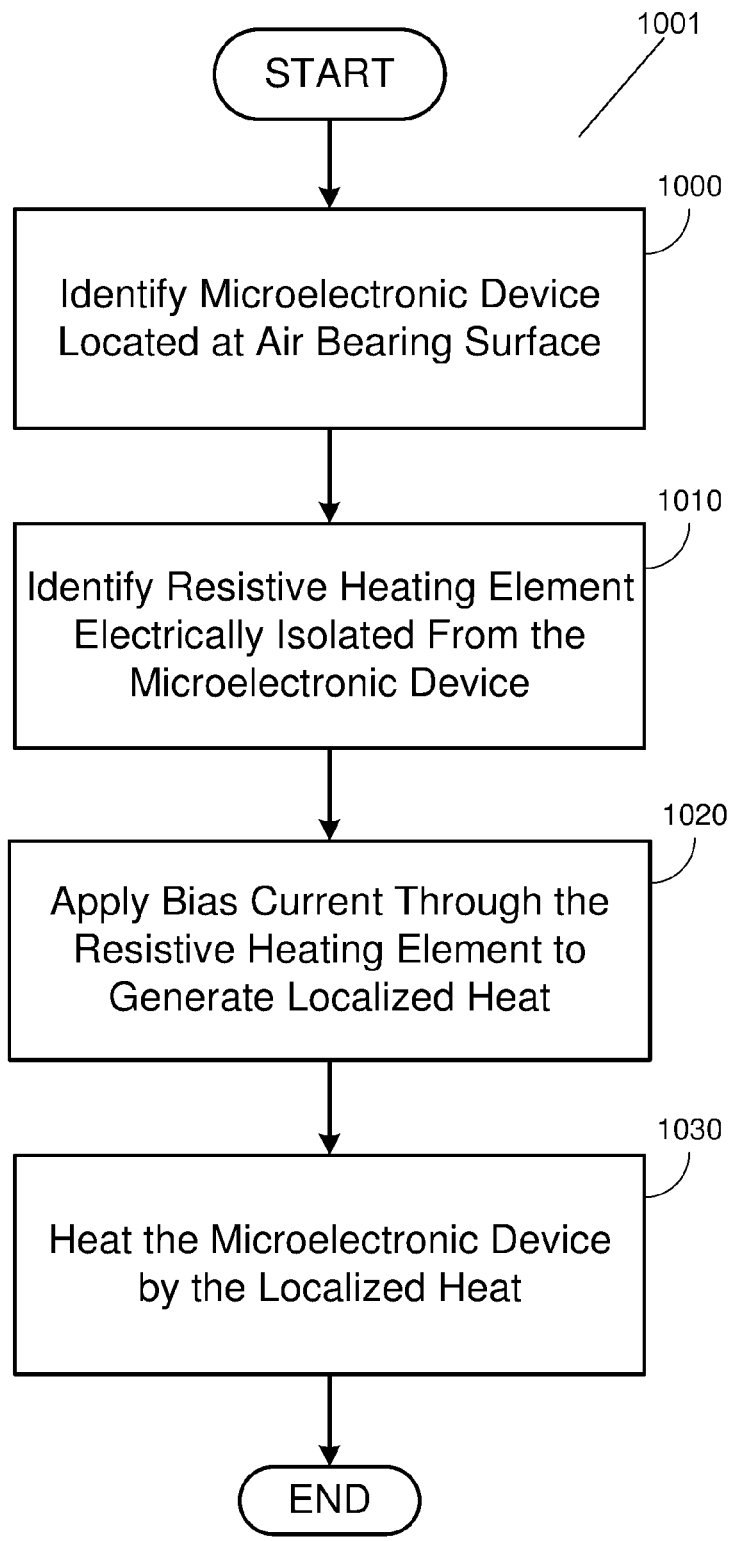
FIG. 10 is a flowchart diagram for various operations of a method, in accordance with at least one embodiment of the invention.

FIG. 10 is a flowchart diagram depicting various operations for a method according to the present invention. The described method may be controlled or mediated by a computer as a heater control program 1001, or the method may be performed independently of any computer. At operation 1000, the method includes identifying a microelectronic device 220. The microelectronic device may be located at an air bearing surface 200. At operation 1010, the method includes identifying a resistive heating element 230. The resistive heating element 230 may be electrically isolated from the microelectronic device 220. At operation 1020, the method includes applying a bias current through the resistive heating element 230 to generate localized heat. At operation 1030, the method includes heating the microelectronic device 220 by the localized heat.

Figure 11:
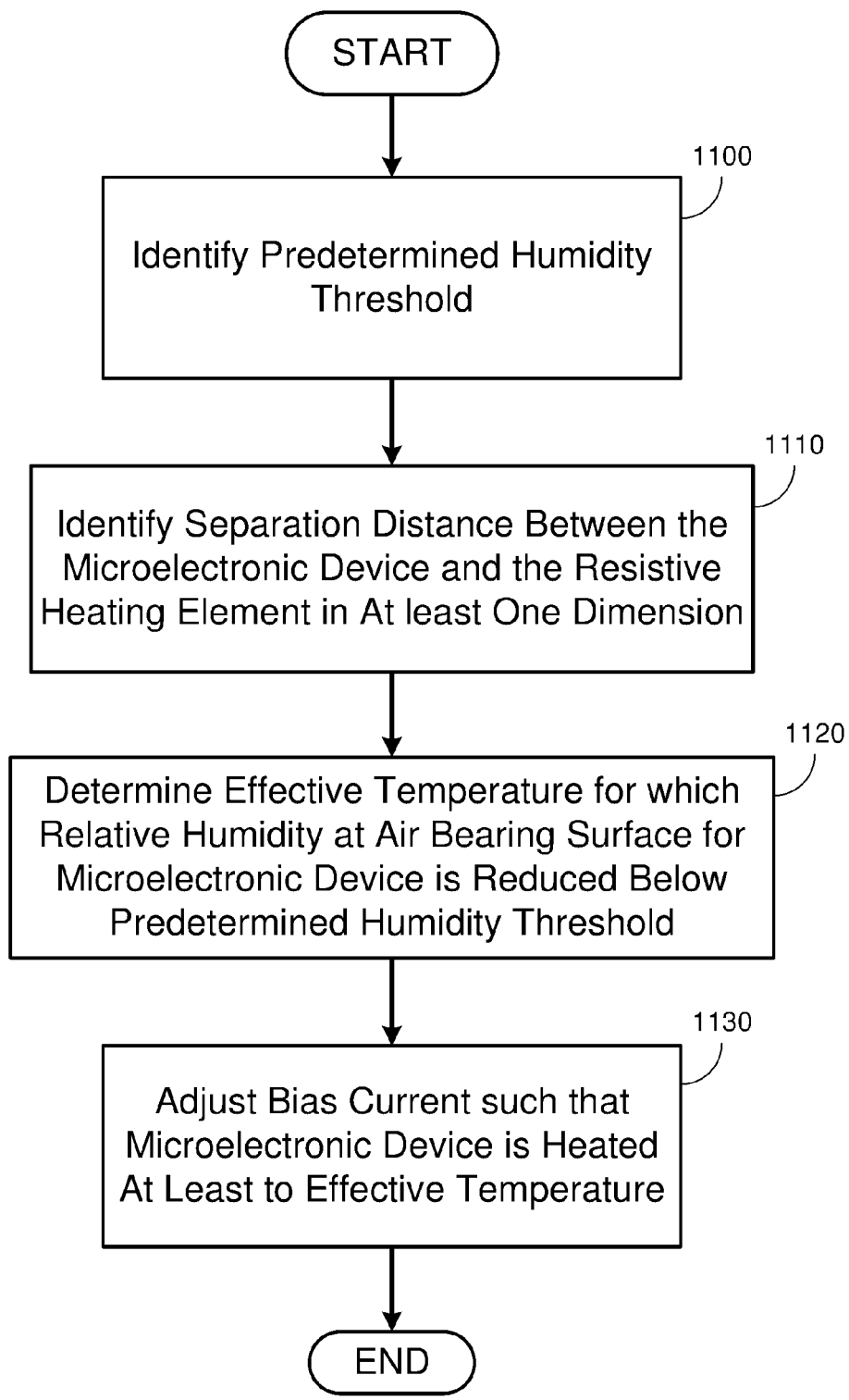
FIG. 11 is a flowchart diagram for additional operations of a method, in accordance with at least one embodiment of the present invention.

FIG. 11 is a flowchart diagram depicting additional operations for the method according to the present invention. At operation 1100, the method includes identifying a predetermined humidity threshold. The predetermined humidity threshold may be chosen, based on project-specific and material-specific considerations at a value at which corrosion is expected to be inhibited by the above-discussed processes and effects. In the above-discussed example, a local relative humidity of 30% at an air bearing surface may be deemed sufficient, for some embodiments to prevent corrosion at the air bearing surface. Other values for a humidity threshold may be chosen in other contexts, including non-static varying values or relative humidity criteria according to a rejection curve, etc. At operation 1110, the method includes identifying a separation distance 250 between the microelectronic device 220 and the resistive heating element 230 in at least one dimension 290. At operation 1120, the method includes determining an effective temperature for which relative humidity at that region of the air bearing surface 200 where the microelectronic device is located is reduced below the predetermined humidity threshold. Determining the effective temperature may be accomplished according to any of the means described above. At operation 1130, the method includes adjusting the bias current such that the microelectronic device 220 is heated at least to the effective temperature, thereby preventing corrosion of the microelectronic device.

Figure 12:
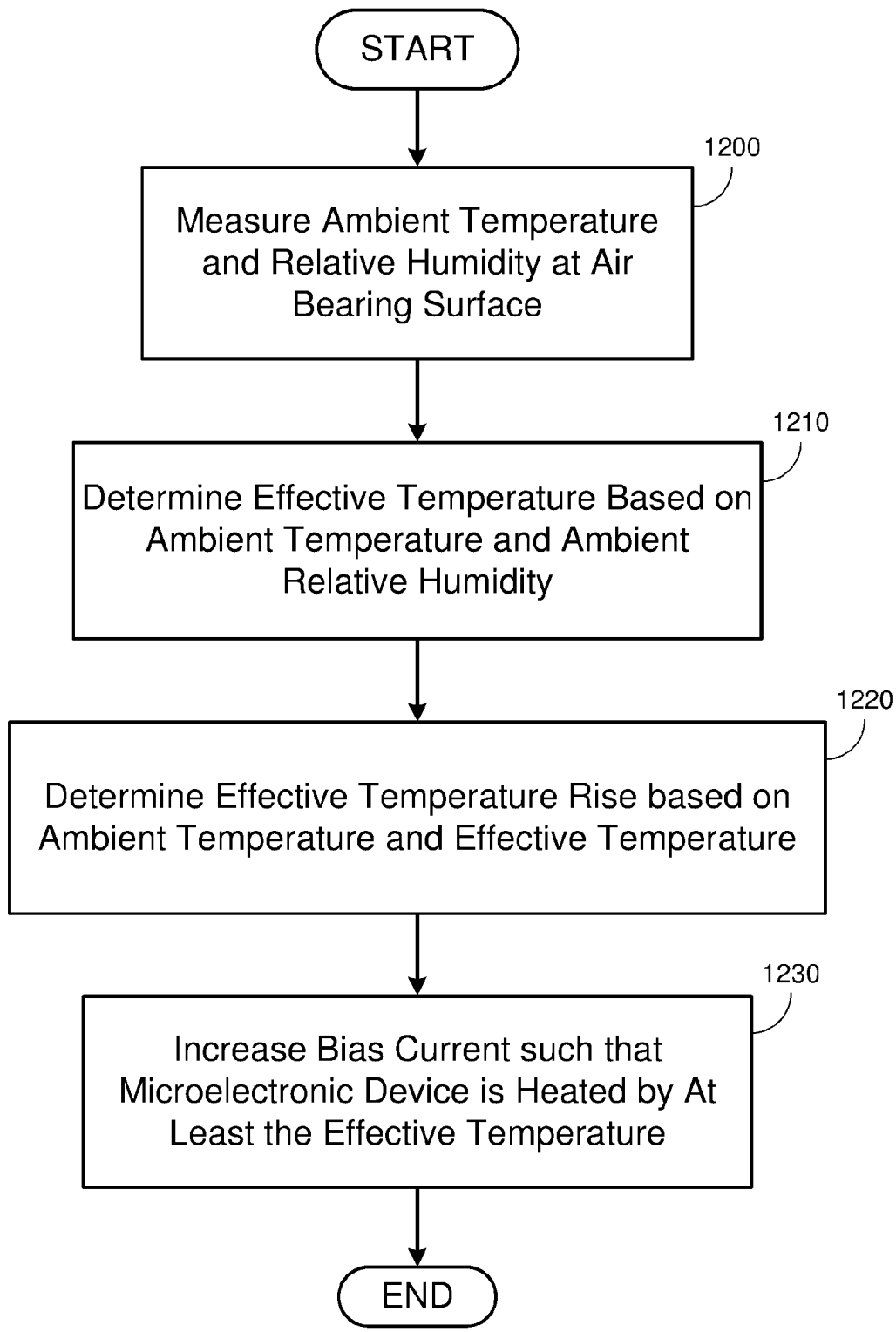
FIG. 12 is a flowchart diagram for additional operations of a method, in accordance with at least one embodiment of the present invention.

FIG. 12 is a flowchart diagram depicting additional operations for the method according to the present invention. At operation 1200, the method includes measuring an ambient temperature at the air bearing surface 200. The measurement may be accomplished by any of the above-described means. Still at operation 1200, the method includes measuring an ambient relative humidity at the air bearing surface 200. The measurement may be accomplished by any of the above-described means. Further, measurements taken "at" the air bearing surface 200 include measurements taken near or proximate to the air bearing surface, such that the measured value provides a reasonable estimate of the true value at the air bearing surface 200, an in particular, at the microelectronic device 220. At operation 1210, more specifically than at operation 1120, determining the effective temperature is based on the ambient temperature and the ambient humidity, according to the means described above. At operation 1220, the method includes determining an effective temperature rise, based on the ambient temperature and the effective temperature, for example, as described above, by subtracting the ambient temperature from the effective temperature to yield the amount by which the local temperature must rise to reach the effective temperature. At operation 1230, the method includes increasing the bias current such that the microelectronic device is heated by at least the effective temperature rise.

Accordingly, the present invention may be understood as including one or more methods of operating the structures described above, whether manually, by computer-controlled automation, or otherwise. A computerized controller may include a computer, such as the exemplary computer 1300 according to FIG. 13, which may be incorporated into the hardware companying the microelectronic device 220 and resistive heating element 230, and the leads of one or more resistive heating elements 230 may be placed in electronic communication and/or control, for example through the I/O interfaces 1312 as external devices 1318, or otherwise. Program instructions for the computerized controller may be understood as a heater control program 1001, which may perform the operations of the methods of the invention. However, it will be appreciated that the operations of the method(s) disclosed herein include the electrical and physical operation of the structures recited, and they need not be performed with the assistance of any computer.

Figure 13:
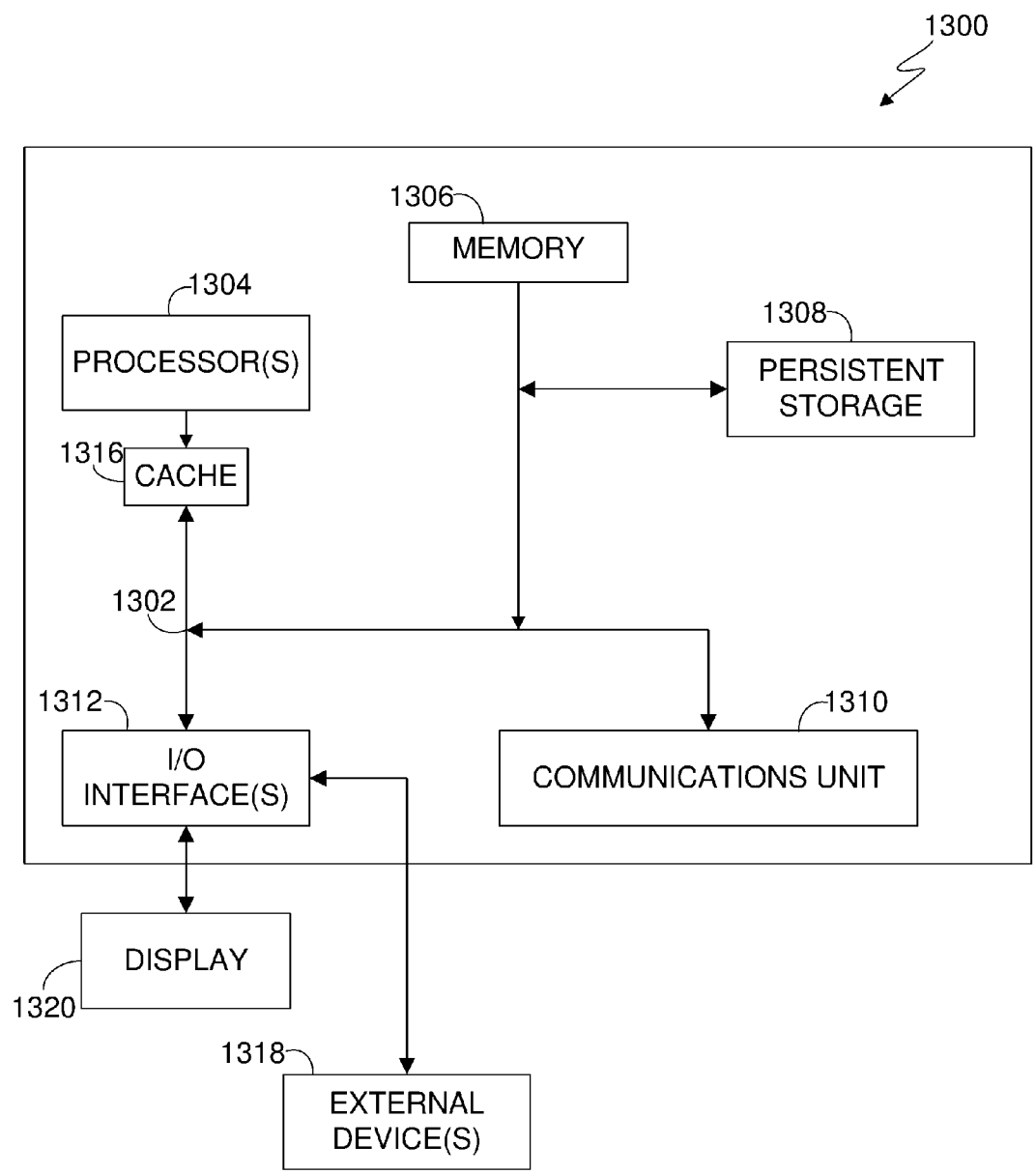
FIG. 13 is a block diagram depicting various logical elements for a computer system capable of executing program instructions, in accordance with at least one embodiment of the present invention.

FIG. 13 is a block diagram depicting components of a computer 1300 suitable for executing the heater control program 1001. FIG. 13 displays the computer 1300, the one or more processor(s) 1304 (including one or more computer processors), the communications fabric 1302, the memory 1306, the RAM, the cache 1316, the persistent storage 1308, the communications unit 1310, the I/O interfaces 1312, the display 1320, and the external devices 1318. It should be appreciated that FIG. 13 provides only an illustration of one embodiment and does not imply any limitations with regard to the environments in which different embodiments may be implemented. Many modifications to the depicted environment may be made.

As depicted, the computer 1300 operates over a communications fabric 1302, which provides communications between the cache 1316, the computer processor(s) 1304, the memory 1306, the persistent storage 1308, the communications unit 1310, and the input/output (I/O) interface(s) 1312. The communications fabric 1302 may be implemented with any architecture suitable for passing data and/or control information between the processors 1304 (e.g., microprocessors, communications processors, and network processors, etc.), the memory 1306, the external devices 1318, and any other hardware components within a system. For example, the communications fabric 1302 may be implemented with one or more buses or a crossbar switch.

The memory 1306 and persistent storage 1308 are computer readable storage media. In the depicted embodiment, the memory 1306 includes a random access memory (RAM). In general, the memory 1306 may include any suitable volatile or non-volatile implementations of one or more computer readable storage media. The cache 1316 is a fast memory that enhances the performance of computer processor(s) 1304 by holding recently accessed data, and data near accessed data, from memory 1306.

Program instructions for the heater control program 1001 may be stored in the persistent storage 1308 or in memory 1306, or more generally, any computer readable storage media, for execution by one or more of the respective computer processors 1304 via the cache 1316. The persistent storage 1308 may include a magnetic hard disk drive. Alternatively, or in addition to a magnetic hard disk drive, the persistent storage 1308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 1308 may also be removable. For example, a removable hard drive may be used for persistent storage 1308. Other examples include optical and magnetic disks, thumb drives, and smart cards that are inserted into a drive for transfer onto another computer readable storage medium that is also part of the persistent storage 1308.

The communications unit 1310, in these examples, provides for communications with other data processing systems or devices. In these examples, the communications unit 1310 may include one or more network interface cards. The communications unit 1310 may provide communications through the use of either or both physical and wireless communications links. The heater control program 1001 may be downloaded to the persistent storage 1308 through the communications unit 1310. In the context of some embodiments of the present invention, the source of the various input data may be physically remote to the computer 1300 such that the input data may be received and the output similarly transmitted via the communications unit 1310.

The I/O interface(s) 1312 allows for input and output of data with other devices that may operate in conjunction with the computer 1300. For example, the I/O interface 1312 may provide a connection to the external devices 1318, which may include a keyboard, keypad, a touch screen, and/or some other suitable input devices. External devices 1318 may also include portable computer readable storage media, for example, thumb drives, portable optical or magnetic disks, and memory cards. Software and data used to practice embodiments of the present invention may be stored on such portable computer readable storage media and may be loaded onto the persistent storage 1308 via the I/O interface(s) 1312. The I/O interface(s) 1312 may similarly connect to a display 1320. The display 1320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A structure comprising:
an air bearing surface;
said air bearing surface comprising a plurality of material layers;
said plurality of material layers being arranged in at least one dimension on said air bearing surface;
a microelectronic device;
said microelectronic device comprising at least one of said plurality of material layers;
a resistive heating element;
said resistive heating element comprising at least one of said plurality of material layers;
said resistive heating element being electrically isolated from said microelectronic device; and
said microelectronic device being heated by said resistive heating element;
said microelectronic device and said resistive heating element being separated by an effective distance such that, for a predetermined level of bias current passed through said resistive heating element, said microelectronic device is heated at least to an effective temperature whereat relative humidity at that region of said air bearing surface where said microelectronic device is located is reduced below a predetermined humidity threshold;
said microelectronic device and said resistive heating element being distinct structures;
said resistive heating element comprising a thin film resistor;
said resistive heating element being one of a plurality of resistive heating elements;
at least two of said plurality of resistive heating elements being powered from a common source such that said at least two of said plurality of resistive heating elements are commonly controllable via said common source;
a tape;
said tape being movable in said at least one dimension;
said tape being elevated above said air bearing surface;
said microelectronic device and said resistive heating element being packaged together as a module;
said microelectronic device comprising a tape writer;
said tape writer being configured for writing to said tape;
said tape writer comprising a first electromagnetic pole element and a second electromagnetic pole element; and
said first electromagnetic pole element and said second electromagnetic pole element being separated by a write gap.

* * * * *